Patented Dec. 5, 1922.

1,437,816

UNITED STATES PATENT OFFICE.

HOWARD S. PAINE AND JOHN HAMILTON, OF WASHINGTON, DISTRICT OF COLUMBIA, DEDICATED, BY MESNE ASSIGNMENTS, TO THE PEOPLE OF THE UNITED STATES.

PROCESS FOR PREPARING FONDANT OR CHOCOLATE SOFT CREAM CENTERS.

No Drawing. Application filed July 26, 1922. Serial No. 577,756.

(FILED UNDER THE ACT OF MARCH 3, 1883, 22 STAT. L., 625.)

*To all whom it may concern:*

Be it known that we, HOWARD S. PAINE and JOHN HAMILTON, citizens of the United States of America and employees of the Department of Agriculture of the United States of America, residing at Washington, District of Columbia, have jointly invented a new and useful Process for Preparing Fondant or Chocolate Soft Cream Centers, of which the following is a specification.

This application is made under the act of March 3, 1883, chapter 143 (22 Stat., 625) and the invention herein described and claimed may be used by the Government of the United States, its officers and employees, and by any person in the United States either in public or private work without payment to us of any royalty thereon.

In the art of manufacturing fondant or chocolate soft cream centers, the customary practice is to add a certain proportion of commercial glucose, invert sugar, honey or other saccharine substance at some time during the candy making process to prevent too rapid crystallization of sucrose and resulting formation of coarse or large crystals. The product obtained in this way possesses a smooth or soft consistency rather than the coarse, granular texture characteristic of fondant which has grained too rapidly. Owing to the fact, however, that it is considered the best commercial practice to mold confectionery of this nature before coating with chocolate or other material, it is only possible to add as much glucose or invert sugar as will permit of satisfactory molding. It is sometimes desired to produce a soft center having the appearance of being partially liquefied, and for this purpose sufficient glucose or invert sugar cannot be used to give at the same time the desired semi-liquid consistency and a soft cream which can be satisfactorily molded. In order to secure this semi-liquefaction, the customary commercial practice is to add a small amount of tartaric acid or some other acid while the fondant is being prepared and before molding and coating with chocolate or other material. When sufficient acid has been used, a partial hydrolysis of the sugar present (sucrose) is accomplished, and it is possible in this way to make soft centers which to a certain degree become semi-liquid in consistency on storage. This method does not give the degree of liquefaction at times desired, however, and is objectionable for the reason that when sufficient acid is used to give the necessary hydrolysis the product possesses too much of an acid flavor.

We have discovered that by the addition of a very small amount of a concentrated preparation of the enzyme invertase, preferably obtained from brewer's yeast but which may be obtained from other sources, it is possible to secure the desired semi-liquid consistency without the addition of acid. Chocolate soft cream centers prepared in this way are as fluid as are ever desired and do not possess an objectionable flavor. By using a standardized preparation of the invertase, moreover, more uniform quality may be secured and the process controlled more accurately than by other known methods.

The method is not confined to the method of hand or machine rolling of the fondant before coating. It is especially adapted to the large scale method of candy making in which the fondant is re-melted and cast in starch or otherwise molded by hand or machine before coating with chocolate or other material. This permits making up large batches of fondant at a time and subsequently at any later time re-melting, adding invertase, and molding In practicing our process, we have used a commercial invertase preparation of standardized strength to make chocolate coated cream centers of varying degrees of fluidity. We have stored these creams for different periods of time and have analyzed them, proving thereby that the liquefaction is produced by the hydrolysis of sucrose by the action of the enzyme invertase.

In carrying out our process we may proceed as follows:

The fondant or soft cream is prepared in the customary commercial manner up to the point when it is remelted for molding. At some time during the melting operation when the temperature of the melt is preferably between 70–85° C., but it may be higher or lower, a certain amount of invertase is added and thoroughly mixed in, after which the cream is molded and coated with chocolate or other material in the usual manner. The amount of invertase required varies obviously with the length of time it is desired to store the candy after the fondant or cream has been coated with chocolate or other material. The hydrolysis of sucrose by invertase is a time reaction and is not produced instantaneously. Assuming that 2-4 weeks would customarily be allowed for storage, we use per 100 lbs. of granulated sugar used in making the fondant approximately 4 or 2 ounces of invertase (of such a strength that 1 gram added to 2000 cc. of a 9% sucrose solution containing 2 cc. of glacial acetic acid will give sufficient inversion at 25° C. in 1 hour to reduce the reading of this solution in a 2 decimeter tube to 23° Ventzke.). The proportion of invertase, however, may be greater or less than this.

Having thus described our invention, we claim:

1. A process for preparing candy with soft cream centers, which consists of cooking a mixture of sucrose, commercial glucose and water to a temperature of approximately 240° F., then creaming the cooked mixture at a temperature of approximately 90° F. to form a fondant, subsequently re-melting the resulting fondant, thereafter thoroughly mixing therewith at a temperature of approximately 155° F. a small amount of invertase, and finally molding said fondant and coating the same with an edible coating.

2. A process for preparing fondant or soft cream centers to be coated with an edible coating, which includes remelting the fondant, and incorporating invertase therewith during said remelting operation.

3. A process for preparing candy with soft cream centers, which consists of cooking a mixture of sucrose, a syrup essentially non-sucrose and water, to a temperature of approximately 240° F., then creaming the cooked mixture at a temperature of approximately 90° F. to form a fondant, subsequently re-melting the resulting fondant, thereafter thoroughly mixing therewith at a temperature of approximately 155° F. a small amount of invertase, and finally molding said fondant and coating the same with an edible coating.

4. A process for preparing candy with soft cream centers, which consists of boiling a mixture of four parts of sucrose, one part of commercial glucose and 1⅔ parts of water, creaming the resulting product at a temperature of approximately 90° F. to form a fondant, re-melting the fondant and thoroughly mixing therewith at a temperature of approximately 70° C. about 1/100 of a part of invertase, and finally molding said fondant and coating the same with an edible coating.

In testimony whereof, we affix our signatures in the presence of two subscribing witnesses.

HOWARD S. PAINE.
JOHN HAMILTON.

Witnesses:
CHARLES F. WALTON, Jr.,
JOSEPH COHEN.